US008989668B2

(12) United States Patent
Srivatsa et al.

(10) Patent No.: US 8,989,668 B2
(45) Date of Patent: Mar. 24, 2015

(54) ORDERING A LIST OF WIRELESS DEVICES FOR DISPLAY IN A GRAPHICAL USER INTERFACE

(71) Applicant: Apple Inc., Cupertino, CA (US)

(72) Inventors: Akshay M. Srivatsa, Santa Clara, CA (US); Craig P. Dooley, Los Gatos, CA (US); Matt I. Gillette, San Ramon, CA (US); Michael J Giles, San Jose, CA (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 13/913,138

(22) Filed: Jun. 7, 2013

(65) Prior Publication Data

US 2014/0364060 A1     Dec. 11, 2014

(51) Int. Cl.
*H04B 7/00* (2006.01)
*H04W 4/00* (2009.01)
*H04W 8/00* (2009.01)

(52) U.S. Cl.
CPC .............. *H04W 4/008* (2013.01); *H04W 8/005* (2013.01)
USPC .......................... 455/41.2; 455/518; 370/328

(58) Field of Classification Search
USPC .......................... 455/41.2, 518, 519; 370/328
See application file for complete search history.

(56) References Cited

U.S. PATENT DOCUMENTS

| | | | | |
|---|---|---|---|---|
| 7,030,863 | B2 * | 4/2006 | Longe et al. | 345/173 |
| 7,272,407 | B2 * | 9/2007 | Strittmatter et al. | 455/500 |
| 7,818,480 | B2 * | 10/2010 | Hoerl et al. | 710/62 |
| 7,920,132 | B2 * | 4/2011 | Longe et al. | 345/173 |
| 8,855,562 | B2 * | 10/2014 | Rajaraman et al. | 455/41.2 |
| 2014/0233458 | A1 * | 8/2014 | Georgescu et al. | 370/328 |
| 2014/0244007 | A1 * | 8/2014 | Kampman | 700/91 |

* cited by examiner

*Primary Examiner* — Minh D Dao
(74) *Attorney, Agent, or Firm* — Meyertons Hood Kivlin Kowert & Goetzel, P.C.; Jeffrey C. Hood (57) ABSTRACT

This document describes, inter alia, techniques for use at a wireless device for establishing communications with other devices, and for displaying related information in a graphical user interface. The wireless device may discover, pair with, and/or connect to other wireless devices, and may display a list of information regarding the other wireless devices in a graphical user interface. The wireless device may order the list based on factors such as: the connectivity status of the other devices (e.g., whether the other devices are connected, paired, or discovered); the types of the other wireless devices (e.g., whether the devices are human interface devices (HIDs), audio devices, phones, imaging devices, computers, or other types of devices); whether device names for the other wireless devices are known/unknown; and/or other factors. The features described herein may be implemented using Bluetooth wireless technology, and/or any other wireless technology.

20 Claims, 6 Drawing Sheets

FIG. 2

◇ Connected Status: Connected
    Device Type: HID Devices (alphabetical)
    Device Type: Audio Devices (alphabetical)
    Device Type: Phones (alphabetical)
    Device Type: Imaging Devices (alphabetical)
    Device Type: Computers (alphabetical)
    Device Type: Other (alphabetical)   302

◇ Connected Status: Paired - not connected
    Device Type: HID Devices (alphabetical)
    Device Type: Audio Devices (alphabetical)
    Device Type: Phones (alphabetical)
    Device Type: Imaging Devices (alphabetical)
    Device Type: Computers (alphabetical)
    Device Type: Other (alphabetical)   304

◇ Connected Status: Discovered - not paired / connected
    ◇ Device Type: HID Devices
        Named Status: Named (by RSSI)
        Named Status: Unnamed
    ◇ Device Type: Audio Devices
        Named Status: Named (by RSSI)
        Named Status: Unnamed
    ◇ Device Type: Phones
        Named Status: Named (by RSSI)
        Named Status: Unnamed
    ◇ Device Type: Imaging Devices
        Named Status: Named (by RSSI)
        Named Status: Unnamed
    ◇ Device Type: Computers
        Named Status: Named (by RSSI)
        Named Status: Unnamed
    ◇ Device Type: Other
        Named Status: Named (by RSSI)
        Named Status: Unnamed   306

ORDERING A LIST OF WIRELESS DEVICES FOR DISPLAY IN A GRAPHICAL USER INTERFACE

BACKGROUND

1. Technical Field

This document describes wireless networking technology and related user interface technology.

2. Related Art

Many wireless devices provide a user interface that allows a user to manage the establishment of communications with other devices. For example, some Bluetooth devices provide a user interface that shows nearby Bluetooth devices, and that allows users to set up and manage pairings/connections with the nearby devices. Despite the considerable efforts spent in designing and implementing these types of user interfaces (and the technologies related to/underlying these types of user interfaces), further improvements in this area would be desirable.

SUMMARY

This document describes, inter alia, techniques for use at a wireless device related to the establishment of communications with other devices, and for displaying related information in a graphical user interface.

As one example of the features described herein, a wireless device may discover, pair with, and/or connect to other wireless devices. The wireless device may display a list of the other wireless devices in a graphical user interface, and the list may be ordered by the wireless device based on factors such as: the connectivity status of the other devices (e.g., whether the other devices are connected, paired, or discovered); the types of the other wireless devices (e.g., whether the devices are human interface devices (HIDs), audio devices, phones, imaging devices, computers, or other types of devices); whether device names for the other wireless devices are known/unknown; and/or other factors. The features described herein may be implemented using Bluetooth wireless technology, and/or any other wireless technology.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

The Detailed Description makes reference to the following Figures.

DETAILED DESCRIPTION

Figure 1:
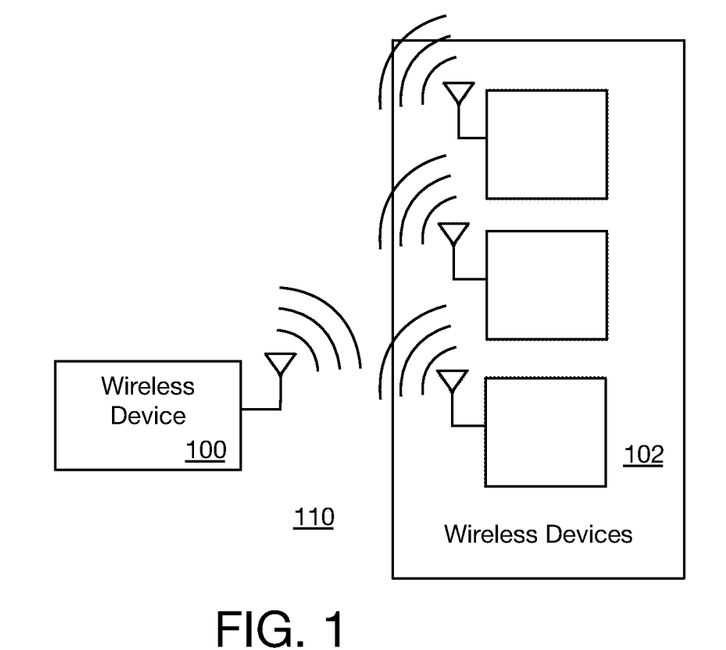
FIG. 1 shows an example network architecture where features described herein may be implemented.

FIG. 1—Example Network Architecture

In the following description, reference will be made to some Bluetooth-specific features; this is done for ease of description, and it should be understood that the features described herein may used, mutatis mutandis, in the context of any wireless technology.

FIG. 1 shows an example network architecture 110 wherein features described herein may be implemented. The example network architecture 110 includes a wireless device 100 and one or more other wireless devices 102. The wireless device 100 may be, for example, a desktop or laptop computer, a smartphone, a tablet computer, or any other type of device. The one or more other wireless devices 102 may include devices such as but not limited to: a mouse; a keyboard; a headset (i.e., headphone combined with a microphone); a trackpad; a joystick; a headphone; a speaker; a printer; a scanner; a desktop computer; a laptop computer; a smartphone; a tablet computer; a media player; a camera; a video game console; a wireless modem; a wireless dongle; a watch; or a display device.

The wireless device 100 may include components including but not limited to a processor (which may run/execute an operating system and applications for the device, and/or perform other functionality), a memory device and/or storage device (which may be coupled to the processor and which may store the operating system, applications, and related data), and a wireless interface (for communicating wirelessly with the other wireless devices 102, using Bluetooth and/or other wireless technologies). The wireless device 100 may also include and/or be connected to a display device (e.g., a Liquid Crystal Display (LCD) or Light-Emitting Diode (LED) display, or other type of display device).

The wireless device 100 may interact with the other wireless devices 102 in a number of different ways, including but not limited to the following: discovering other devices; pairing with other devices; connecting to other devices; obtaining information regarding capabilities/classes of other devices; receiving device name information from other devices; and obtaining signal strength information with respect to other devices. Details regarding how these interactions may be performed will be provided in the following paragraphs.

Discovering other devices: The wireless device 100 may discover devices from the other wireless devices 102 in a number of different ways. This may include, for example, the wireless device 100 performing inquiry and/or inquiry scan procedures. In an inquiry procedure, the wireless device 100 may transmit inquiry packets, and may receive responsive inquiry response packets (and/or Extended Inquiry Response (EIR) packets) from the other wireless devices 102. In an inquiry scan procedure, the wireless device 100 may scan for and receive inquiry packets from the other wireless devices 102 (and transmit responsive inquiry response and/or EIR packets). An inquiry response packet may include information such as the Media Access Control (MAC) address of the device that transmitted the packet (the "BD_ADDR" of the wireless device), and/or other information. Additionally, an EIR packet may include information such as a Device Name for the device that transmitted the EIR packet.

Pairing with other devices: As an example, two devices may be considered "paired" (or "bonded") when they have performed a procedure to exchange information and/or share data for establishing communication, e.g., where the two devices have performed a procedure for creating a link key (a shared secret key) and both store the link key. Accordingly, to pair with another wireless device, the wireless device 100 may exchange information with the other device in order to establish the link key. When the wireless device 100 pairs with another wireless device, it may do so using a Bluetooth Secure Simple Pairing (SSP) procedure, a legacy Bluetooth pairing procedure, and/or any other pairing or similar procedure.

Connecting to other devices: As an example, two devices may be considered "connected" when they have exchanged information in order to synchronize clocks and are able to communicate data bi-directionally. Accordingly, in some instances, when connecting with another device, the wireless device 100 may exchange information in order to synchronize clocks with the other device and/or to otherwise establish bi-directional communications. Alternatively or additionally, when the wireless device 100 connects to another wireless device, this may include the wireless device 100 and the other device establishing an Asynchronous Connection-Less (ACL) link, a Synchronous Connection-Oriented (SCO) link, and/or a connection above the Link Manager (LM) layer. In many instances, the wireless device 100 is paired with other devices to which it is connected; however, this is not always the case and, in other instances, the wireless device 100 may be connected to another device with which it is not paired.

Obtaining information regarding capabilities/classes of other devices: The wireless device 100 may receive information regarding the capabilities/classes of the other wireless devices 102 in one or more messages received at the wireless device 100 when discovering, pairing with, and/or connecting to the other wireless devices. As one example of how the wireless device 100 may receive this information, the wireless device 100 may receive one or more Class of Device parameters in the inquiry or inquiry response messages received during the discovery process. A Class of Device parameter may include a Major Device Class field and a Minor Device Class Field. The Major Device Class field is a 5-bit field that indicates the type of device; different values for the Major Device Class field indicate that the device that transmitted the Class of Device parameter containing the Major Device Class field falls within one of the following categories: computer (e.g., desktop, notebook, PDA, organizer); phone (e.g., cellular, cordless, pay phone, modem); LAN/network access point; audio/video (e.g., headset, speaker, stereo, video display, VCR); peripheral (e.g., mouse, joystick, keyboard); imaging (e.g., printer, scanner, camera, display); wearable; toy; health; miscellaneous; or uncategorized (device code not specified). For each Major Device Class value, the Minor Device Class field may further define the sub-type of device. Some example of Major Device Class fields and their corresponding Minor Device class field values are shown in Table One, as follows:

TABLE ONE

| Major Device Class | Minor Device Class fields |
| --- | --- |
| computer | desktop workstation; server-class computer; laptop; handheld PC/PDA (clamshell); palm-size PC/PDA; wearable computer (watch size); tablet; or uncategorized |
| Imaging | display; camera; scanner; printer; or combination of two or more of display, camera, scanner, printer |
| phone | cellular; cordless; smartphone; wired modem or voice gateway; common ISDN access; or uncategorized |
| audio | wearable headset device; hands-free device; microphone; loudspeaker; headphones; portable audio; car audio; set-top box; HiFi Audio Device; VCR; video camera; camcorder; |

TABLE ONE-continued

| Major Device Class | Minor Device Class fields |
| --- | --- |
| | video monitor; video display and loudspeaker; video conferencing; gaming/toy; or uncategorized |

Obtaining signal strength information with respect to other devices: The wireless device 100 may determine the strength of signals received from the other wireless devices 102, and store corresponding RSSI information. The wireless device 100 may perform the signal strength measurements on, for example, the signals that constitute the above-mentioned inquiry or inquiry response packets, and/or other messages/signals received from the other wireless devices 102.

Receiving device name information from other devices: As mentioned above, the wireless device 100 may receive device name information in received EIR packets. Alternatively or additionally, the wireless device 100 may receive device name information from the other wireless devices 102 via other messages or signals received from the other wireless devices 102. In some instances, for various reasons, one or more of the other wireless devices 102 may not transmit device name information to the wireless device 100, and so the wireless device 100 may not have device name information for those devices.

While FIG. 1 shows the wireless device 100 and the other wireless devices 102 as within wireless range with each other, it should be understood that, at a given time, the wireless device 100 may also store information regarding devices with which is not currently within wireless range—i.e., for devices that it may have discovered, paired with, and/or connected to in the past. For example, it is possible for the wireless device 100 to still be paired with another wireless device that is not currently within wireless range, provided that the wireless device 100 and the other wireless device continue to store their link key (and related information) when not within range of each other.

Figure 2:
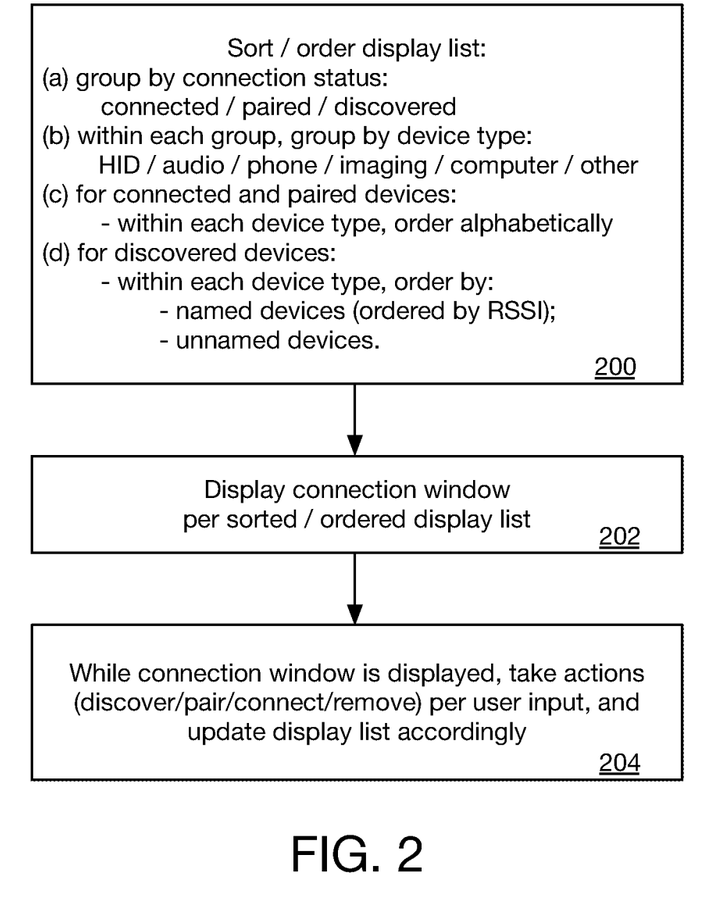
FIG. 2 illustrates a method that includes sorting/ordering a list of wireless devices for display in a graphical user interface.
Figure 3:
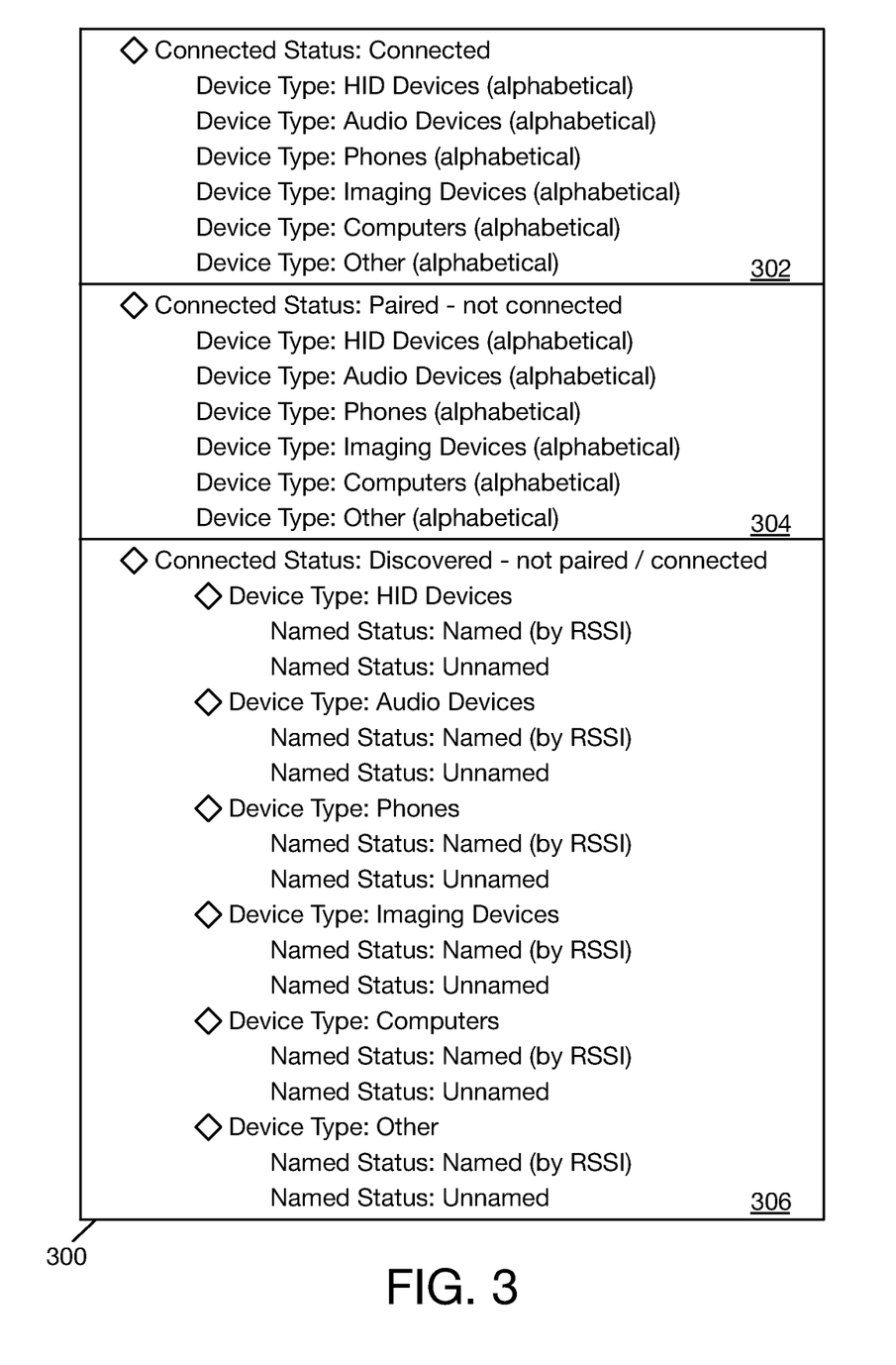
FIG. 3 shows an example of how a list of wireless devices may be sorted/ordered.

FIG. 2 Through FIG. 3—Method for Sorting/Ordering List of Devices

FIG. 2 shows a method that may be performed at the wireless device 100 for sorting/ordering a list of other wireless devices (referred to in the following as the "display list") for display in a window (referred to in the following as the "connection window") in a graphical user interface.

As the method of FIG. 2 begins, the wireless device 100 may have discovered, paired with, connected to, and/or otherwise communicated with one or more of the other wireless devices 102 (and/or other wireless devices not currently in wireless range of the wireless device 100), as described above with reference to FIG. 1, and the wireless device 100 may store information regarding these devices in the display list. The information stored by the wireless device 100 may include information such as but not limited to device name information, BD_ADDR information, link keys, RSSI information, and/or other types of information mentioned above with respect to FIG. 1.

The method of FIG. 2 may begin at step 200, with the wireless device 100 sorting/ordering the display list. The wireless device 100 may perform the sorting/ordering of the display list as follows:

(a) in an aspect, the wireless device 100 groups/orders the wireless devices 102 according to their connection status with respect to the wireless device 100—i.e., whether the other devices are connected to the wireless device 100 (i.e., whether they have an active connection to the wireless device 100, whether or not they are paired to the wireless device 100), are paired with (but not connected to) the wireless device 100, or are discovered by the wireless device 100 (i.e., have been discovered but are not paired or connected)—in the following order: connected devices are ordered at the top of the list; paired (but not connected) devices are ordered below the connected devices; and discovered devices are ordered below the connected devices (at the bottom of the display list);

(b) in an aspect, within each of the groups from (a), the wireless devices in the display list are ordered by the wireless device 100 into six different types/categories, in the following order: HID devices are ordered at the top; audio devices are ordered below HID devices; phones are ordered below audio devices; imaging devices (e.g., printers, scanners, cameras, and displays) are ordered below phones; computers are ordered below imaging devices; and "other" devices (i.e., not HID/audio devices/phones/imaging devices/computers) are ordered below audio devices;

(c) in an aspect, for the connected devices and the paired devices: within each device type, the wireless devices are ordered alphabetically by device name (e.g., within connected HID devices, the devices are sorted by device name; within connected audio devices, the devices are sorted by device name, and so on); and (d) in an aspect, for the discovered devices: within each device type, the devices are ordered/grouped into subgroups according to whether they are named or not named (where a device is considered "named" if the wireless device 100 has received device name information regarding the device, and "not named" if the wireless device 100 has not received device name information regarding the device), with the named devices subgroup being ordered above the unnamed devices subgroup; additionally, within the named devices, the devices are ordered according to order of RSSI (i.e., where a device with a better RSSI value is ordered above a device with a worse RSSI value).

The wireless device 100 may perform action (b) mentioned above in a number of different ways. For example, in an instance where the wireless device 100 has received and stored Major Device Class and/or Minor Device Class information, the wireless device 100 may map from the Major Device Class/Minor Device Class information into the different types/categories (HID/audio/other/computer) mentioned above. As one example of how this may be done, the wireless device 100 may map from Major Device Class values into types/categories based at least in part on the approach indicated in Table Two, as follows:

TABLE TWO

| Major Device Class | Type/Category |
|---|---|
| computer | computer |
| phone | phone |
| LAN/network access point | other |
| audio/video | audio |
| peripheral | HID |
| imaging | imaging |
| wearable | other |
| toy | other |
| health | other |
| miscellaneous | other |
| uncategorized | other |

The wireless device 100 may implement the sorting/ordering described above in a number of different ways. As one example, the wireless device 100 may store a weight (or running total) for each of the wireless devices, add points to the weights based on the characteristics of the wireless devices, and then sort/order the devices according to the weights. For example, each device that is connected may have a value of 10,000 added to their weight, each device that is paired have value a value of 5,000 added to their weight, and devices that are discovered may have a value of 0 added to their weight. Then, the wireless device 100 may further increment the weights according to device type/category, adding a weight of 500 for HID devices, 400 for audio devices, 300 for phones, 200 for imaging devices, 100 for computers, and 0 for other devices. The wireless device 100 may also increment, in a similar/analogous fashion, the weights for other characteristics of the devices (such as whether they are named/unnamed, their RSSI is, and so on). The above-listed numbers (10,000, 5,000, 500, 400, and so on) are provided purely by way of example; this technique may be employed using any set of weights/ranges. Alternatively or additionally, the wireless device 100 may only perform a portion of the sorting/ordering based on weights (for example, only to sort within discovered devices), and may use other techniques for performing the remaining sorting/ordering.

Referring now to FIG. 3, FIG. 3 shows a graphical representation 300 of how the wireless device 100 may sort/order the display list at step 200. As shown in the graphical representation 300, connected devices (which are shown in area 302) are ordered above paired devices (which are in turn shown in area 304), which are ordered above discovered devices (which are in turn shown in area 306). Also as shown in FIG. 3, within connected, paired, and discovered devices, devices are grouped according to device type, with HID devices at the top, followed by audio devices, phones, imaging devices, computers, and other devices. Further, for connected and paired devices, devices are ordered alphabetically within device type; and, for discovered devices, devices are ordered according to whether they are named and unnamed (with named devices above unnamed devices), and named devices are additionally ordered by RSSI.

Referring back to FIG. 2, at step 202, the wireless device 100 may display the sorted display list within the connection window. Although referred to for convenience as a "window," the connection window may be any user interface element, including but not limited to a tab or a panel/pane (contained within another window), and/or any other component in a graphical user interface. As one example, the connection window may be implemented as a "Bluetooth Preferences Pane" or similar window that is as a configuration utility that is part of the operating system that runs on the wireless device 100.

The connection window may include, for example, the device names for the wireless devices in the display list, graphical and/or textual representations of the connection statuses of the wireless devices, icons that correspond to the wireless devices (indicating the types/categories of the devices, and/or other information), and so on. Further, the connection window may include one or more control elements (e.g., buttons, checkboxes, choice boxes, drop down boxes, and so on) for receiving user input related to the devices represented in the display list. The user interface controls may include controls for initiating actions such as: pairing with and/or connecting to discovered devices; connecting to paired devices; disconnecting from and/or removing pairings from connected devices; removing pairings from paired devices; performing a discovery procedure to discover new devices; and/or other actions.

Displaying the user interface component at step 202 may include the wireless device 100 determining vector and/or scalar data required to represent the display window in a graphical format, translating graphics data as represented in the format defined in the operating system of the wireless device 100 to a format required by the display device included in and/or connected to the wireless device 100, rendering the data in the display device included in and/or connected to the wireless device 100, and/or other actions.

At step 204, the wireless device 100 may receive user input that is responsive to the information displayed at step 202, and take action responsive to the user input. This may include, for example, the wireless device receiving user input via one of the controls in the connection window and taking an action indicated by the user input. For example, in an instance where the display window includes a control to initiate pairing with a discovered device, the wireless device 100 may receive user input indicating that the wireless device 100 should pair with a discovered device, and then initiate a pairing with the discovered device. The wireless device 100 may perform analogous functionality for other actions, including but not limited to: connecting to discovered devices; connecting to paired devices; disconnecting from and/or removing pairings from connected devices; removing pairings from paired devices; and/or other actions. When the wireless device 100 performs one of the above-mentioned actions (i.e., pairing with a new device, connecting to a discovered device, discovering devices, and so on) in response to user input, the wireless device 100 may also update the display list (to reflect that a new device has been paired with, connected to, or discovered, and so on); in such an instance, the wireless device 100 may also sort/order the display list (as described above with reference to step 200) to reflect the new contents of the display list, and update the information including in the connection window accordingly.

Alternatively or additionally, at step 204, the wireless device 100 may perform actions to obtain information regarding the wireless devices included in the display list (for example, performing procedures to obtain device name information); in such an instance, when the wireless device 100 obtains information that might trigger a re-sorting/re-ordering of the display list, the wireless device 100 may re-sort/re-order with the new information (as described above with reference to step 200) to reflect the new contents of the display list), and update the information included in the connection window accordingly Although FIG. 2 as drawn shows distinct steps, this is done for ease of description, to convey the different types of actions that the wireless device 100 may perform with respect to the other wireless devices 102 and the display list; the steps of the method of FIG. 2 may, in various implementations, be done in any order (including concurrently), and/or in any particular combination. Further, each or any of the actions described above as taking place as part of a particular step may be temporally interleaved with each or any of the actions described above as being included as part of a different step. For example, while it is described above that the sorting/ordering of the display list takes place at step 200, it should be understood that the sorting/order may take place while the display list is being displayed at step 202.

Figure 4:
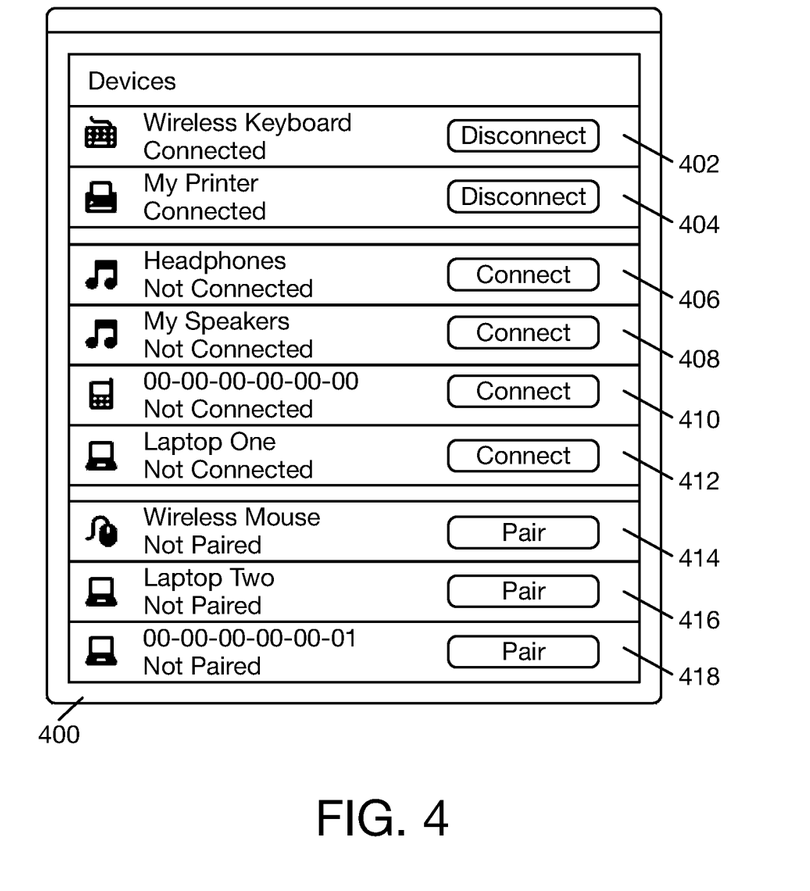
FIG. 4 shows an example window that shows how a list of wireless devices may be sorted/ordered.
Figure 5:
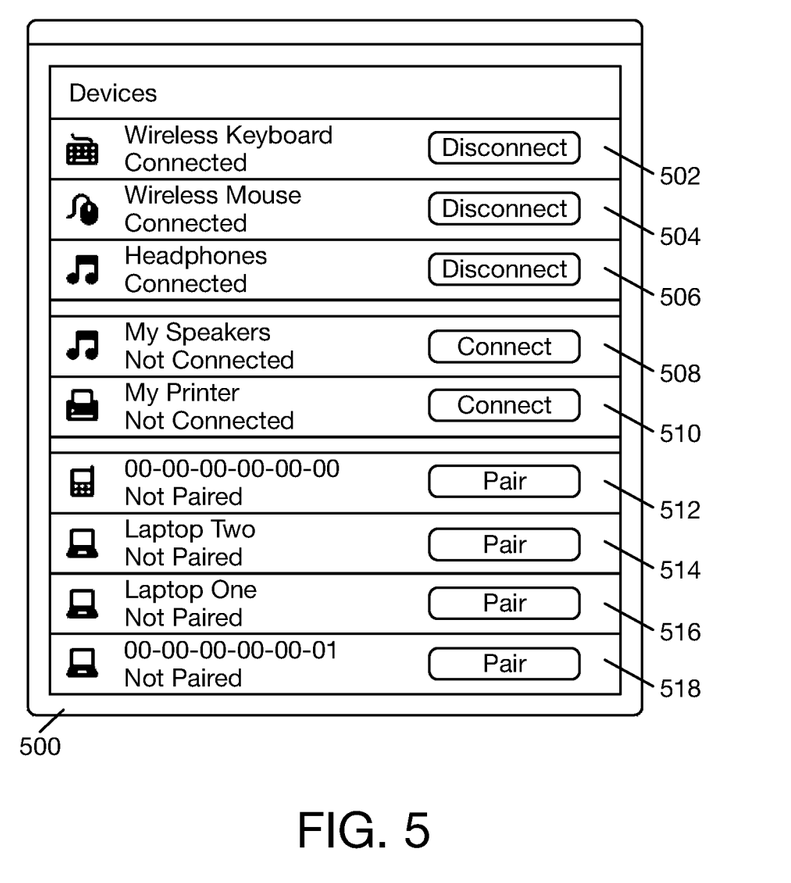
FIG. 5 shows a second example window that shows how a list of wireless devices may be sorted/ordered.

FIG. 4 and FIG. 5—Sorting/Ordering Examples

Referring now to FIG. 4, FIG. 4 shows an example connection window 400 that may be displayed by the wireless device 100 using the method of FIG. 2. According to the example of FIG. 4, the display list (which may be sorted by the wireless device 100 at step 200) includes data that is related to the following example set of information shown in Table Three:

TABLE THREE

| Order in List | Device Name | Connectivity Status | Device Category | RSSI |
|---|---|---|---|---|
| 1 | "Wireless Keyboard" | connected | HID | −45 dBm |
| 2 | "My Printer" | connected | other | −50 dBm |
| 3 | "Headphones" | paired | audio | N/A |
| 4 | "My Speakers" | paired | audio | N/A |
| 5 | Unknown (BD_ADDR: 00-00-00-00-00-00) | paired | other | −50 dBm |
| 6 | "Laptop One" | paired | computer | N/A |
| 7 | "Wireless Mouse" | discovered | HID | −45 dBm |
| 8 | "Laptop Two" | discovered | computer | −65 dBm |
| 9 | Unknown (BD_ADDR: 00-00-00-00-00-01) | discovered | computer | −55 dBm |

As shown in FIG. 4, the "Wireless Keyboard" and "My Printer" devices are sorted to the top of the display list (because they are connected to the wireless device 100), and are displayed in areas 402 and 404. The "Headphones," "My Speakers," "00-00-00-00-00," and "Laptop One" devices are paired (but not connected) devices and so are displayed in, respectively, areas 406, 408, 410, and 412, below the connected devices. Further, the "Wireless Mouse," "Laptop Two," and "00-00-00-00-00-01" devices are discovered (i.e., not paired and not connected), and so are displayed in, respectively, areas 414, 416, and 418, below the paired devices. Within each of the different connectivity statuses (i.e., connected/paired/discovered), the devices are further sorted/ordered as described above with reference to step 200 of FIG. 2 and the graphical representation 300 of FIG. 3.

FIG. 5 shows a second example connection window 400 that may be displayed by the wireless device 100 using the method of FIG. 2. In the example of FIG. 5, the same devices that are shown in FIG. 4 are shown; however, some characteristics of the devices are different relative to the characteristics shown per the example of FIG. 4, to further highlight how the wireless device 100 may perform the sorting/ordering at step 200. According to the example of FIG. 5, the display list includes data that is related to the following example set of information shown in Table Four:

TABLE FOUR

| Order in List | Device Name | Connectivity Status | Device Category | RSSI |
|---|---|---|---|---|
| 1 | "Wireless Keyboard" | connected | HID | −45 dBm |
| 2 | "Wireless Mouse" | connected | HID | −45 dBm |
| 3 | "Headphones" | connected | audio | −45 dBm |
| 4 | "My Speakers" | paired | audio | N/A |
| 5 | "My Printer" | paired | other | −50 dBm |
| 6 | Unknown (BD_ADDR: 00-00-00-00-00-00) | discovered | phone | −50 dBm |
| 7 | "Laptop Two" | discovered | computer | −55 dBm |
| 8 | "Laptop One" | discovered | computer | −65 dBm |
| 9 | Unknown (BD_ADDR: 00-00-00-00-00-01) | discovered | computer | −45 dBm |

As shown in FIG. 5, the "Wireless Keyboard," "Wireless Mouse," and "Headphones" devices are sorted to the top of the display list (because they are connected to the wireless device 100), and are displayed in areas 502, 504, and 506, respectively. The "My Speakers" and "My Printer" devices are paired (but not connected) devices and so are displayed in, respectively, areas 508 and 510, below the connected devices. Further, the "00-00-00-00-00-01," "Laptop Two," "Laptop One," and "00-00-00-00-00-01" devices are discovered (i.e., not paired and not connected), and so are displayed in, respectively, areas 512, 514, 516, and 518, below the paired devices. Within each of the different connectivity statuses (i.e., connected/paired/discovered), the devices are further sorted/ordered as described above with reference to step 200 of FIG. 2 and the graphical representation 300 of FIG. 3. For example: within the discovered devices, the "Laptop Two" device is sorted above the "Laptop One" device, even though both are named and "Laptop One" precedes "Laptop Two" alphabetically, because the RSSI value for "Laptop Two" (−55 dBM, as shown in Table Four) is better than the RSSI value for "Laptop One" (−65 dBM, as shown in Table Four).

Figure 6:
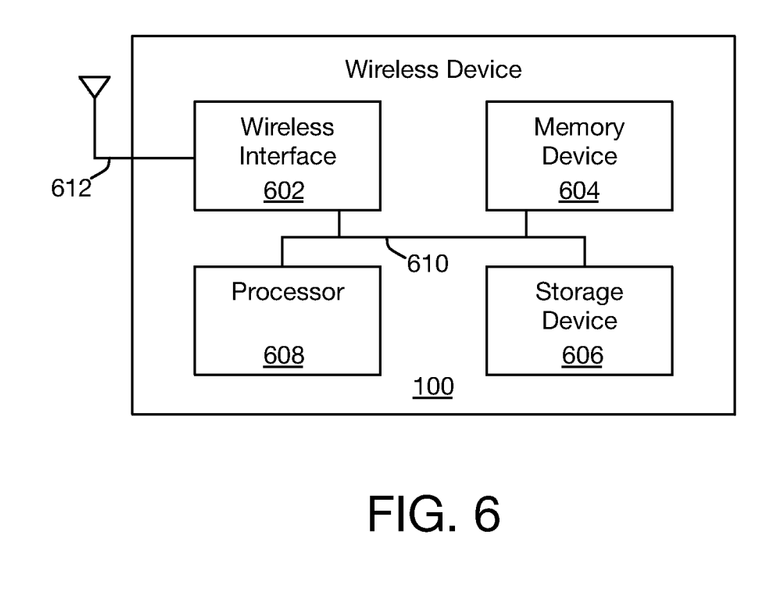
FIG. 6 shows an example hardware configuration for a wireless device.

FIG. 6—Example Configuration of Wireless Device Hardware

FIG. 6 shows an example hardware configuration via which the wireless device 100 may be implemented.

As shown in FIG. 6, the wireless device 100 may include a wireless interface 602, memory device 604, storage memory 406, and processor 608, which are connected via system bus 610. The wireless device 100 may also include an antenna 612, coupled to the wireless interface 602.

The processor 608 may be a component such as an integrated circuit that may include logic circuitry configured to perform data processing and related actions. The processor 608 may be or include, for example, a single- or multi-core processor, a digital signal processor (DSP), a plurality of microprocessors, one or more microprocessors in association with a DSP core, a controller or microcontroller, one or more Application Specific Integrated Circuits (ASICs), one or more Field Programmable Gate Array (FPGA) circuits, an application processor (AP), or a system-on-a-chip (SOC). Alternatively or additionally, the processor 608 may be configured to use an instruction set architecture such as x86, ARM, and/or any other instruction set architecture.

The memory device 604 may be or include a device such as a RAM (such as a D-RAM or S-RAM), or other type of memory device. The storage device 606 may be or include a hard disk, a flash memory, a magneto-optical medium, an optical medium, or other type of data storage device.

The wireless interface 602 may be or include one or more integrated circuits (or portion of thereof) or other type of circuit (or portion of thereof), or other type of component for implementing wireless communications and related functionality. The wireless interface 602 may include: a memory module; a processor and/or specific-purpose DSP circuitry for implementing functionality such as but not limited to baseband signal processing, physical layer processing, data link layer processing, and/or other functionality; one or more digital to analog converters (DACs) for converting digital data to analog signals; one or more analog to digital converters (ADCs) for converting analog signals to digital data; and radio frequency (RF) circuitry (e.g., one or more amplifiers, mixers, filters, phase lock loops (PLLs), and/or oscillators); and/or other components. The wireless interface may communicate using Bluetooth technology, and/or any other wireless technology.

As mentioned above, the wireless interface 602 may be coupled to the antenna 612 in the wireless device 100. It should be understood that, whenever it is described in this document (including but not limited to with reference to FIG. 1 through FIG. 5) that the wireless device 100 transmits wireless data, the transmitting may include the wireless interface 602 providing one or more signals to the antenna 612, which may then be transmitted by the antenna 612 as radio frequency (RF) or other electromagnetic (EM) signals; similarly, whenever it is described in this document (including but not limited to with reference to FIG. 1 through FIG. 5) that the wireless device 100 receives wireless data, the receiving may include the antenna 612 receiving RF (or other EM) signals, and providing the signals to the wireless interface 602 for processing.

Although not shown in FIG. 6, the wireless device 100 may be connected to a display device (such an a LCD, LED, or OLED monitor) and/or include a display device (such a touchscreen based on LCD or LED/OLED technology). In such an instance the wireless device 100 may include additional components (such as but not limited to a Graphics Processing Unit (GPU)) that may be connected to the system bus 610 and which may play a role in the display of data via the connected/included display device(s).

Alternatively or additionally, the wireless device 100 may be connected to and/or include an input device, such as a keyboard, mouse, touchpad, or touchscreen. Alternatively or additionally, the wireless device 100 may also include and/or be connected to any number of other components not shown in FIG. 6, including but not limited to one or more additional wireless interfaces, interfaces for wired (e.g., Ethernet) communications, and/or components for other functionality.

The memory device 604 and/or the storage device 606 may store instructions which, when executed by the processor 608, cause the processor 608 to perform (in conjunction, as appropriate, with the wireless interface 602, memory device 604, storage device 606, a display device, and/or an input device) any feature or any combination of features described in this document (including but not limited to with reference to FIG. 1 through FIG. 5) as performed by the wireless device 100.

Alternatively or additionally, each or any of the different types of data described in this document (including but not limited to with reference to FIG. 1 through FIG. 5) as generated and/or processed by the wireless device 100 may be processed/generated by the processor 608 and may be stored in the memory device 604 and/or storage device. Alternatively or additionally, the wireless communications (and related actions) described in this document (including but not limited to with reference to FIG. 1 through FIG. 5) as performed by the wireless device 100 may be performed using the wireless interface 602 (in conjunction with, as appropriate, the processor 608, memory device 604, storage device 606, and/or antenna 612).

Further, it should be understood that the hardware configuration shown in FIG. 6 is only one example, and that the wireless device 100 may be implemented using any appropriate hardware configuration capable of performing the actions described herein as performed by the wireless device 100.

Further Applications of Described Concepts

Although examples are provided herein that describe the ordering of different groups (for example, in step 200 of FIG. 2, it is described that connected devices are ordered above paired devices, which are in turn ordered above discovered devices), it should be understood that any of the orderings/sequences described herein may be re-arranged in any order. For example, in various implementations of the described concepts, a top-to-bottom ordering of paired/connected/discovered or discovered/paired/connected (or any other variation) may be used. Similar comments apply, mutatis mutandis, to any of the other sequences/orderings described herein, such as the orderings of device types, named/unnamed devices, and so on.

Further, while the use of six device types/categories (HID/audio devices/phones/imaging devices/computers) is described above, it should be understood that this is only one example of a device typing/categorization approach that may be used; any number of different device typing/categorization approaches may also be used, involving any number of different types/categories (e.g., two, three, four, five, seven, and so on different types/categories) and/or that involve categorization based on different attributes than those described above.

Alternatively or additionally, although features and elements are described herein in particular combinations, each feature or element can be used in isolation or in any combination with or without the other features and elements. For example, while step 200 of FIG. 2 is described as including sorting/ordering based on multiple factors (such as connectivity status, device type, and other factors), it should be understood that, in various implementations, only a single described factor (and/or any combination or sub-combination of the described factors) may be used.

Although examples are provided above that relate to Bluetooth wireless technology, it should be understood that the features described herein may also be used, mutatis mutandis, with any other wireless technology, including but not limited to one or more of: GSM/EDGE; UMTS (FDD or TDD); CDMA2000; LTE; LTE-A; Wi-Fi (e.g., IEEE 802.11a, 802.11b, 802.11g, 802.11n, 802.11ac, and/or other IEEE 802.11 technologies); and/or other wireless technologies.

Although the terms "list" and "display list" are used throughout this document, this is done purely for ease of description; the terms "list" and "display list" as used herein should be understood to include any data structure or combination of data structures that may be used to represent the information described herein as represented by a "list" or "display list." For example, the features described herein may be implemented using data structures such as but not limited to arrays, tuples, linked lists, sets, queues, stacks, trees, graphs, maps/dictionaries, and/or any other data structure and/or combination of data structures.

Although examples are provided herein wherein the wireless device 100 includes or is connected to a display device, it should be understood that the features described herein may also be used in an instance where the wireless device 100 is wirelessly connected to a display device. In such an instance, the wireless device 100 may be communicate graphics data (and/or other related data) to the display device using a technology such as WirelessHDTV (WiDi), Wireless Home Digital Interface, Wireless HDMI, IEEE 802.11ad (WiGig), and/or any other appropriate wireless technology.

GLOSSARY OF TERMS

The following is a glossary of terms used in this document:

Bluetooth: As used herein, the term "Bluetooth" refers to the wireless technology developed by the Bluetooth Special Interest Group (SIG). "Bluetooth" as used herein may include (but is not limited to) communications as defined accordingly to one or more of: an IEEE 802.15.1 standard; the Bluetooth 4.0 Core Specification (which is available as of the filing date of this document at http://developer.bluetooth.org, and which is hereby incorporated by reference for all purposes); a "Bluetooth Classic" protocol; or a "Bluetooth Low Energy" protocol. The term "Bluetooth" includes present and future versions of Bluetooth wireless technologies.

Non-transitory computer-readable medium: A device for data storage, such as a hard disk, an optical medium (such as a CD-ROM, a DVD, or a BluRay disc), a magneto-optical medium, a memory device (such as a Dynamic Random Access Memory (D-RAM), Static RAM (S-RAM), or other type of Random Access Memory (RAM)), a register, a cache memory, a Read Only Memory (ROM), a flash memory (based on, e.g., EEPROM flash memory technology or NAND flash memory technology), or other type of non-transitory device for electronic data storage. The memory device 604 and the storage device 606 of FIG. 6 are two examples of non-transitory computer-readable media. A non-transitory computer-readable medium is distinguishable from a transitory computer-readable medium, such as a transitory signal.

What is claimed is:

1. A method for use in a wireless device that includes a processor, a Bluetooth wireless interface, and a memory device, and that includes or is connected to a display device, the method comprising:
   discovering, pairing with, and connecting to one or more other wireless devices, using the Bluetooth wireless interface;
   storing, in the memory device, a list of the other wireless devices;
   sorting, at the processor, the list of the other wireless devices, wherein the sorting includes:
      grouping each of the other wireless devices into groups that include:
         a first group that includes wireless devices from the other wireless devices which the wireless device has discovered but to which the wireless device is not paired or connected;
         a second group that includes wireless devices from the other wireless devices with which the wireless device has paired but to which the wireless device is not connected; and
         a third group that includes wireless devices from the other wireless devices to which the wireless device is connected; and
      for each of the first group, the second group, and the third group, ordering the other wireless devices within the group according to a device type of the other wireless device; and
   displaying, at the display device, the sorted list of the other wireless devices.

2. The method of claim 1, wherein the device type is one of:
   a human interface device (HID) device type;
   an audio device type;
   a phone device type;
   an imaging device type;
   a computer device type; or
   an other device type, wherein the other device type indicates that a device is not a HID device, audio device, phone device, imaging device, or computer device.

3. The method of claim 2, further comprising:
   receiving, using the Bluetooth wireless interface, for each of the other wireless devices, a message that includes a Major Device Class parameter value;
   wherein the ordering of the other wireless devices within the first group, the second group, and the third group according to the device types of the other wireless devices is based on the Major Device Class parameter values.

4. The method of claim 3, wherein the ordering of the other wireless device types based on the Major Device Class parameter values includes mapping from Major Device Class Parameters to device types such that:
   a "peripheral" Major Device Class parameter value is mapped to the HID device type;
   an "audio/video" Major Device Class parameter value is mapped to the audio device type;
   a "phone" Major Device class parameter value is mapped to the phone device type;
   an "imaging" Major Device class parameter value is mapped to the imaging device type;

a "computer" Major Device Class parameter value is mapped to the computer device type; and other Major Device Class parameter values that are not "peripheral," "audio/video," or "computer" are mapped to the other device type.

5. The method of claim 1, further comprising:

receiving, using the Bluetooth wireless interface, device name information for one or more of the wireless devices within the first group; and storing the device name information in the memory device;

wherein the sorting further includes:

grouping the wireless devices within the first group into subgroups that include:

a first subgroup that includes wireless devices within the first group for which the wireless device has device name information; and a second subgroup that includes wireless devices within the first group for which the wireless device does not have device name information.

6. The method of claim 5, further comprising:

determining, using the Bluetooth wireless interface, a received signal strength indicator (RSSI) value for each of the wireless devices within the first subgroup;

wherein the sorting further includes:

ordering the wireless devices within the first subgroup based on the RSSI values for the wireless devices within the first subgroup.

7. The method of claim 1, wherein the wireless device is one of: a laptop computer; a desktop computer; a smartphone; or a tablet computer.

8. The method of claim 1, wherein the other wireless devices include one or more of: a mouse; a keyboard; a headset; a trackpad; a joystick; a headphone; a speaker; a printer; a scanner; a desktop computer; a laptop computer; a smartphone; a tablet computer; a media player; a camera; a video game console; a wireless modem; a wireless dongle; a watch; and a display device.

9. A non-transitory computer-readable medium that stores instructions that, when executed by a processor in a wireless device that includes the processor and a wireless interface, causes the wireless device to perform a method that includes:

discovering, pairing with, or connecting to one or more other wireless devices, using the wireless interface;

sorting, at the processor, a list of the other wireless devices, wherein the sorting includes:

grouping each of the other wireless devices into groups that include:

a first group that includes wireless devices from the other wireless devices which the wireless device has discovered but to which the wireless device is not paired or connected;

a second group that includes wireless devices from the other wireless devices with which the wireless device has paired but to which the wireless device is not connected; and a third group that includes wireless devices from the other wireless devices to which the wireless device is connected; and displaying, at a display device that is connected to or included in the wireless device, the sorted list of the other wireless devices.

10. The non-transitory computer-readable medium of claim 9, wherein the sorting further includes:

for each of the first group, the second group, and the third group, ordering the other wireless devices within the group according to a device type of the other wireless device, wherein the device type is one of a set that includes one or more of:

a human interface device (HID) type;

an audio device type;

a phone device type;

an imaging device type;

a computer device type; or an other device type.

11. The non-transitory computer-readable medium of claim 9, wherein the method further comprises:

receiving, using the wireless interface, for each of the other wireless devices, a message that includes a Major Device Class parameter values;

wherein the ordering of the other wireless devices within the first group, the second group, and the third group according to the device types of the other wireless devices is based on the Major Device Class parameter values.

12. A wireless device, comprising:

an antenna;

a wireless interface coupled to the antenna; and a processor coupled to the wireless interface;

wherein the antenna, the wireless interface, and the processor are configured to perform actions that include one or more of:

communicating with one or more other wireless devices, wherein the communicating includes one or more of pairing with, connecting to, or discovering another wireless device from the other wireless devices; and wherein the processor is further configured to perform actions that include:

sorting a list of the other wireless devices, wherein the sorting includes:

grouping each of the other wireless devices into groups based on whether the other wireless devices are paired to the wireless device, connected to the wireless device, or discovered by the wireless device; and displaying, via a display device that is connected to or included in the wireless device, the sorted list of the other wireless devices.

13. The wireless device of claim 12, wherein the processor is further configured to perform the sorting by:

ordering the other wireless devices according to a device type for each of the other wireless devices.

14. The wireless device of claim 13, wherein the device type for each of the other wireless devices is one of a set that includes one or more of:

a human interface device (HID) device type;

an audio device type;

a phone device type;

an imaging device type;

a computer device type; or an other device type.

15. The wireless device of claim 13, wherein processor is further configured to perform the ordering of the other wireless devices according to the device type based on one or more Major Device Class parameter values received by the wireless device.

16. The wireless device of claim 12, wherein the processor is further configured to perform actions that include:

receiving device name information for one or more of the wireless devices; and wherein the processor and wireless interface are further configured to perform the sorting based on the device name information.

17. The wireless device of claim 12, wherein the processor is further configured to perform the sorting based on one or more received signal strength indicator (RSSI) values.

18. The wireless device of claim 12,
   wherein the wireless interface is a Bluetooth wireless interface, and
   wherein the wireless interface is configured to perform the communicating with the one or more other wireless devices using Bluetooth wireless technology.

19. The wireless device of claim 12, wherein the wireless device is one of: a laptop computer; a desktop computer; a smartphone; or a tablet computer.

20. The wireless device of claim 12, wherein the other wireless devices include one or more of: a mouse; a keyboard; a headset; a trackpad; a joystick; a headphone; a speaker; a printer; a scanner; a desktop computer; a laptop computer; a smartphone; a tablet computer; a media player; a camera; a video game console; a wireless modem; a wireless dongle; a watch; and a display device.

* * * * *